United States Patent Office 2,819,517
Patented Jan. 14, 1958

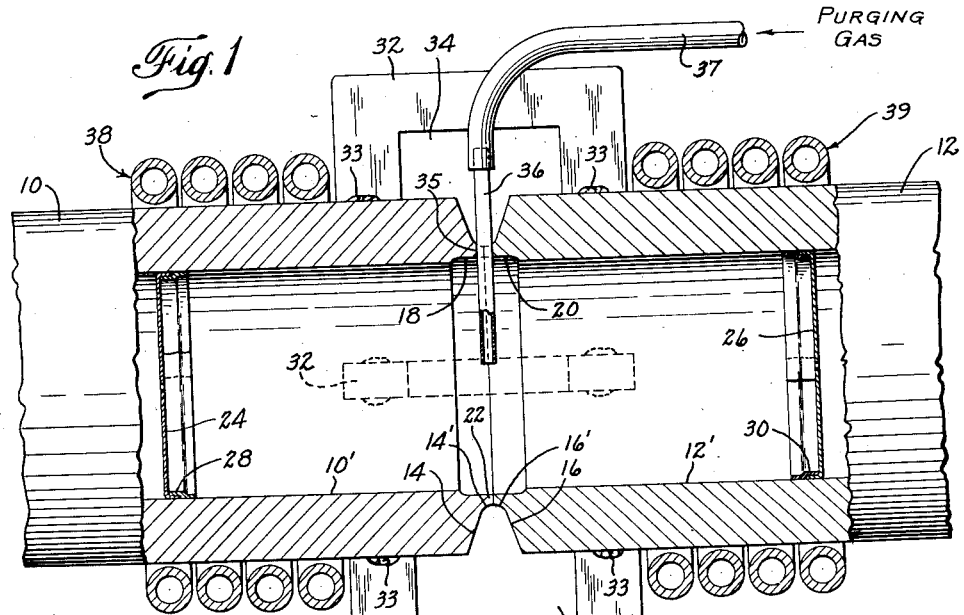
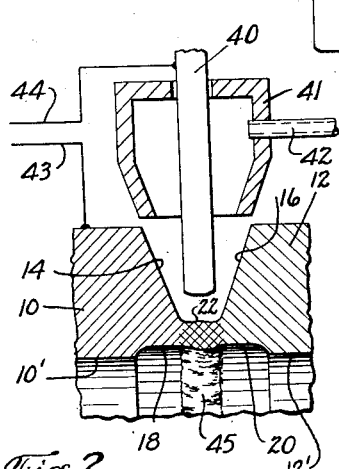
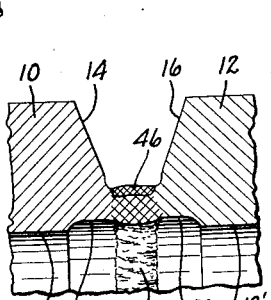
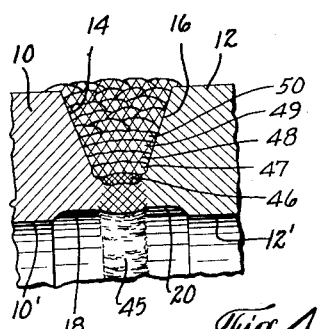
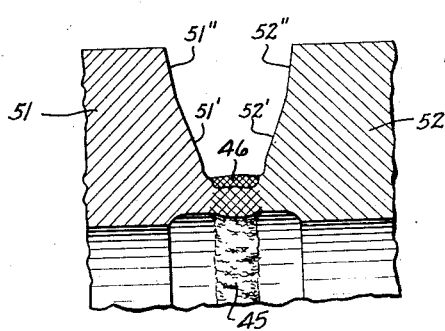

2,819,517

METHOD OF WELDING PIPE ENDS TOGETHER

Robert T. Pursell, Watertown, Mass., assignor to Stone & Webster Engineering Corporation, Boston, Mass., a corporation of Massachusetts Application July 30, 1953, Serial No. 371,320

6 Claims. (Cl. 29—483)

This invention relates to a welding method and apparatus and more particularly concerns a highly improved welding system, adaptable to both shop and field operations, for joining metal structures such as pipes, tubular members and the like, in order to obtain a stronger, more durable weld substantially free from oxides and internal weld imperfections.

Objects and advantages of the invention will be set forth in part hereinafter and in part will be obvious herefrom or may be learned by practice with the invention, the same being realized and attained by means of the steps, instrumentalities and combinations pointed out in the appended claims.

The invention consists in the novel parts, constructions, arrangements, combinations, steps and improvements herein shown and described.

The accompanying drawing referred to herein and constituting a part hereof illustrates one embodiment of the invention and together with the description serves to explain the principles of the invention.

In the drawings:

Fig. 1 is a cross sectional view of the ends of two sections of pipe positioned one against the other preparatory to their joinder in accordance with the inventions;

Figs. 2, 3 and 4 are cross sectional views of a weld showing the successive steps of joining the pipe ends of Fig. 1; and Fig. 5 is a cross sectional view showing a modified formation of pipe ends for welding in accordance with the invention.

In the welding of pipe sections, as well as other metal structures, it is important that the inner portions of the joint are well formed and free from undesirable imperfections, while this applies to metals of all wall thicknesses, the heavier walled pipes are usually beveled about the edges to be welded so that when they are brought together they form essentially a V-shaped groove extending to a point spaced from the underside of the metal or inside of the pipe as the case may be in order to form in effect a thin root portion. The strength and durability of the weld in this root portion in a large part determines the strength of the completed weld. One of the more successful methods for fusing these root sections utilizes an inert gas backing which prevents oxidation of the metal and produces a weld of improved contour and appearance. This procedure, however, involves special fixtures and the like to seal the pipes in order to retain the gas backing during the welding operation and while they enable the production of a good weld, they have been found to be impractical for general use. For instance, certain of these fixtures have been complicated and expensive to fabricate in order to effect a satisfactory gas seal while others were limited to use in particular instances where it was possible to remove them upon completion of the welding operation. Even though inert gas backing for welds has proved a desirable procedure, the problems encountered in field applications as well as in the shop have therefore prevented its general use. It is therefore one object of this invention to provide a method and apparatus that will greatly extend the usefulness of inert gas backing methods so that it may be equally effective for both shop and field applications. To this end temporary discs of a material, capable of withstanding the normal heat of welding, are used to block the pipe sections so that the inert gas may be retained within the welding section. It has been found for instance that certain types of heavy paper are suitable for this purpose and will withstand gas pressures of the order of several ounces which have been found to be more sufficient for attaining the desired ends. Upon completion of the welding operation, the paper can be consumed and destroyed by subjecting the welded section to the relatively high temperatures required for the purpose of annealing the weld. While a heavy brown wrapping paper such, for example, as 50 pound kraft paper, will withstand temperatures of the order of 350° F. the paper will start to burn above temperatures of the order of 600° F. The normal annealing temperatures of welds of this general character is of the order of 1350° F.±25° F. which therefore will completely destroy baffles.

Another object of the invention resides in an improved welding process employing combustible baffles for the retention of the gas within the vicinity of the weld wherein means are also provided for maintaining a uniform gas pressure during the basic welding operations in order to effect a strong and durable root weld substantially free of imperfections and oxidation. These root welds are preferably accomplished by means of a shielded arc wherein a region of inert gas is maintained in the vicinity of the weld as it progresses about the pipe. This arc may be in the form of a single electrode with current flowing between the electrode and the pipe being welded or it may be in the form of a dual electrode welding apparatus wherein the arc merely functions to heat the root of the weld in order to effect the joinder of the metal pieces.

Still another object of the invention resides in the provision of simple and effective means for electrically welding sections of pipe both in the shop and in the field to provide a strong and durable weld, free from imperfections and internal surface oxidation that may result either in a weakening of the weld or the production of fine cracks or crevices that may ultimately extend completely through the weld when subjected to slight stresses and resultant strains.

The above and other advantages and objects of the invention will become more apparent from the following detailed description.

As pointed out above, this invention, while of general applicability, is more particularly useful for the welding of pipe sections either in the shop or in the field and in most any position extending from the vertical to the horizontal. Fig. 1 is a cross sectional view of the end sections of two lengths of pipe that have been prepared for butt welding in accordance with the invention. These pipe sections are denoted by the numerals 10 and 12 in the drawing. The meeting edges of these sections are preferably prepared with partially bevelled edges 14 and 16 which terminate in a short rounded section 14' and 16' at a point spaced from the inner surface 10' and 12' of the pipes 10 and 12 respectfully. The bevelled edges 14, 14', and 16, 16' when brought into meeting relationship as shown in the figure formed in effect a V-shaped groove, having a rounded base section. The inner surface 10' and 12' of the pipes may be undercut as illustrated at 18 and 20 to form a relatively narrow root section 22 forming the base of the weld. The ultimate strength of the final weld is in a large part dependent upon the quality of the weld effected at this root section and while inert gas backing has proved to be a desirable procedure, it has not been possible to employ it because of the difficulty in maintaining the gas in the area of the weld. One of the major difficulties that has arisen in the use of conventional devices for closing the pipes is that they were exceedingly difficult to remove after the welding operation, if not altogether impossible. In the case of short lengths of pipe being welded in a shop, the problem, of course, was a relatively simple one. On the other hand, the welding of long sections of pipe, especially in the field, made it virtually impossible to provide any means for retaining the inert gas in the vicinity of the weld which would be removable upon completion of the weld.

This difficulty, with prior devices, has been completely overcome through the employment of combustible or otherwise destroyable thin circular baffles 24 and 26 positioned within and circumferentially sealed to the end sections of pipes 10 and 12 and spaced from the pipe ends a sufficient distance, for example, approximately six inches, to prevent their destruction by reason of the extremely high weld temperatures. While these baffles may be made of most any type of material, they should preferably ignite and burn at a base metal temperature between 550° F. and 600° F. It has been found that a heavy weight paper, such as a Number 50 kraft paper (brown wrapping paper) has been found to meet these requirements for pipes of diameters ranging from 3 in. to 24 in., inclusive. While kraft paper appears to be one of the more desirable materials for this purpose, onion skin paper, coated with a silicon solution to obtain the required qualities has been found to be satisfactory, although not as advantageous because of the preliminary treating required. In general, however, in carrying out the invention, the baffles or discs 24 and 26 are advantageously paper, preferably kraft paper, which will not scorch materially or lose its strength below about 600° F. and is of a weight in the range of from about 30 lbs. to 70 lbs., advantageously in the range of from about 40 lbs. to about 60 lbs. and, preferably, 50 lbs.

The baffles are preferably secured in position by the use of a masking tape 28 and 30 having an adhesive material on one side thereof for tightly sealing the edges of the baffles 24 and 26 firmly to the inner surface of the respective pipes. With this arrangement a substantially air-tight compartment is formed which is capable of withstanding gas pressure of the order of 3 to 4 ounces. This greatly exceeds the normal gas pressure required for a weld of this character which is generally of the order of one ounce per square inch.

The pipes 10 and 12 may be held in abutting relationship by any suitable apparatus such, for example, as the plurality of U-shaped brackets 32 illustrated in Fig. 1, disposed uniformly about the periphery of the pipes and bridging the V-shaped welding groove 14—16. The legs of these brackets are preferably welded directly to the outer surface of the pipes along their edges 33 with the central opening 34 being centrally located with reference to the welding groove. The size and thickness of these brackets are, of course, determined in part by the diameter and weight of the pipes 10 and 12 and should be heavy enough to hold them in firm abutting relationship.

With the pipes now in position to be welded, a small hole 35 of the order of ⅛ to 3/16 of an inch in diameter is drilled directly through the root 22 of the welding groove and a short length of pipe 36 is inserted therethrough for introducing the inert gas within the closed chamber portion of the pipe determined by the baffles 24 and 26 and the intervening portions of pipes 10 and 12. The purging or inert gas, such as argon, nitrogen, argonhelium mixtures, and the like, is fed to the pipe through a hose 37 or any other suitable means. It is, of course, desirable to employ suitable gas pressure regulating means (not shown) in conjunction with the pipe 36 to maintain the pressure in the vicinity of one ounce per square inch in order to avoid any possibility of blowing out the baffles during the welding procedure.

Prior to the actual welding process, it is preferable to preheat the pipe ends to a temperature of about 350 to 425° F. A temperature of about 400°±25° F. has been found to be most desirable and this temperature can be maintained by the use of thermocouples or other suitable temperature measuring equipment fastened to or otherwise associated with the pipe ends, to control the heating means. One satisfactory method of preheating the pipes utilizes two sets of induction heating coils 38 and 39 disposed about the pipes on either side of the U-shaped clamps 32. These coils 38 and 39 are preferably formed of hollow tubing of copper, stainless steel or the like and interconnected with a transformer in a manner well known in the art. If desired, the coils 38 and 39 may also be internally water cooled in order to prevent undue heating of the coils themselves. This procedure is of course particularly important when lower temperature materials are used in the fabrication of the coils as for instance, copper and the like. Although, induction heating has been found to be most effective in the attainment of the ends of this invention, it is apparent that other types of heating equipment may be employed with substantially equal effectiveness. For instance, instead of induction heating coils 38 and 39, suitable coils of resistance wire may be used or the heating can be affected by a suitable array of blow pipes using acetylene or any of the other well known heating gases as a fuel.

While the brackets 32 as previously described may be welded in position on the pipes prior to the installation of the heating means 38 and 39, it is preferable in most instances to install the heating means first and preheat the pipe ends prior to the attachment of the brackets 32 by welding the legs as indicated by the numerals 33. It is also evident that while the brackets 32 are most easily attached by welding, that any other type of clamp may be used to hold the pipes in alignment during the welding operation and at the same time leave the welding grooves 14—16 unobstructed for the completion of the welding.

With the pipes 10 and 12 now prepared for the welding operation, the root 22 is first welded by an electric arc operating in an atmosphere of inert gas such as argon, helium or the like; no filler metal being used. This welding apparatus is illustrated diagrammatically in Fig. 2 and comprises in effect a central electrode 40 of tungsten or other suitable nonconsuming electrode and a surrounding shield 41, preferably of an insulating material to retain an inert gas in and about the electrode and the welding groove 14—16. The inert gas may be fed into the housing 41 in any suitable manner as for instance by a tube 42. The welding arc is preferably produced by the use of direct current connected between the pipes 10 and 12 and the tungsten electrode 40 by means of any suitable electric conductors 43 and 44. The generation of an arc between the lower end of the electrode and the root part 22 of the weld raises the temperature of the metal to a point just above the melting point and permits the abutting faces to become firmly united as illustrated by the crosshatching in Fig. 2. This weld produces a bead 45 which extends partially within the undercut portions 18 and 20 of the pipes. Thus the undercut portions prevent any serious constriction at the weld since the internal diameter of the bead 45 will still be greater than the internal diameter of the pipes. This initial step of welding the root 22 is accomplished during the presence of the inert atmosphere within the pipes and produces a clean well formed bead. Upon completion of this initial weld, the pipe 36 extending through the opening 35 is removed and the internal bead 45 may be inspected by inserting a suitable optical instrument through the opening 35 and visually checking the degree of penetration obtained throughout the entire periphery of the weld. In the event any lack of sufficient penetration exists, these areas can be marked on the outside of the pipe and upon replacing the gas filler tube 36 and the introduction of the inert backing gas, they can be remelted from the outside by the apparatus shown and described in connection with Fig. 2. In this way a uniform peripheral weld completely penetrating the root throughout its entire length can be easily obtained. Moreover, the visual inspection of the bead 45 can be readily accomplished while maintaining the preferred minimum preheat temperature conditions of 350° F.

After the completion of the root weld, a bead of filler metal 46 is applied as shown in Fig. 3 of the drawings. This filler metal may be deposited with the aid of welding apparatus as described in connection with Fig. 2 for effecting the root weld and the welding is preferably performed with a filler rod comprising an alloy of chromium, manganese, silicon and steel in accordance with ASTM specification #A251. This bead should completely cover the root and be firmly bonded to the root as well as to the side walls 14 and 16 of the V-shaped groove.

During the welding of the root 32 and the application of the first bead 46, the purging pipe 36 is retained in position and gas pressure of the order of one ounce per square inch is maintained within the chamber as defined by the pipes 10—12 and the baffles 24 and 26. In so doing the internal surface of the pipes and weld are protected and remain in excellent condition. Upon the completion of this bead, the tube 36 is withdrawn and visual inspection is performed again in order to be assured of an adequate root condition. Backing gas is bled into the pipe again long enough to fill the reservoir between the paper discs, the copper inlet tube is then removed and the 3/16 hole is immediately filled and closed with filler metal, preferably of the same type used in formation of the bead 46, using the inert gas shielded arc welding process.

The remaining portion of the V groove as defined by the sloping pipe walls 14 and 16 is then completely filled by the application of a plurality of circumferential beads of weld metal substantially as illustrated in Fig. 4. The lower layers 47, 48, 49 and 50 may be applied as single beads extending completely across the V and bonded to both the side walls and the previous bead. The next successive layers may each be built up of a series of beads until the V-shaped groove is entirely filled. In applying these successive beads, a standard electric arc weld process may be used with standard low alloy steel arc welding rods. In the use of an arc welding process, it is important that each bead be entirely cleaned and all slag or flux remaining thereon be removed before the application of the next successive bead. In the event cracks or blow holes should appear in the surface of the bead, it is important that they be removed either by chipping or grinding of the bead before the deposition of the next bead. Normally the innermost layers may be applied with filler metal rods or electrodes of the order of 1/8 of an inch in diameter and successively larger rods of filler metal may be used as the groove is filled up. If desired, these successive beads may be applied by a shielded arc process to avoid undue oxidation of the weld or the beads may be applied by any well known welding process such, for example, as by the use of oxy-acetylene blowpipes.

While the various figures heretofore described illustrate the welds as being accomplished essentially in a horizontal plane, it is apparent, however, that the welds may be effected in any plane extending from the horizontal to the vertical and actual practice has indicated that excellent welds can be obtained without the necessity of rotating or otherwise shifting the position of the pipes being welded during the welding operation.

In welding pipes such as the pipe 10 and 12 as shown by the figures, it is important to stress relieve the weld along with the adjacent portions of the pipe in order to prevent any possibility of the generation of fine cracks in either the weld or the pipe which would thereby greatly weaken the structure. This stress relieving operation is preferably carried out at a temperature of about 1200°–1400° F. and comprises heating a circumferential band about the weld for a distance on each side of the weld of about twice the wall thickness of the pipe. To accomplish this, it is preferable first to remove the supporting brackets 32 shown in Fig. 1 and then either through the use of heating coils 38 and 39 or by the use of separate heating means effect the necessary stress relieving operation. The pipe should be heated to a temperature of approximately 1300° F. on the basis of about 1/2 an hour for each one quarter inch of thickness but in no case should this heating period exceed approximately 2 hours for best results. After heating the welded area, it is preferable to cool the pipe at a rate not exceeding 400° F. per hour until the temperature reaches about 600° F. Continued cooling should then be accomplished in a still atmosphere until the weld is approximately at room temperature.

During this stress relieving operation, the temperature in the vicinity of the paper baffles 24 and 26 will substantially exceed 600° F. and cause the baffles to completely disintegrate along with the adhesive masking tape 28 which secures the baffles to the pipe walls. In this way, the baffles are automatically removed from the pipe leaving it completely free and unobstructed.

The pipes 10 and 12 shown in Figs. 1 through 4 inclusive use a V groove with substantially straight sides 14 and 16 inasmuch as the wall thickness is of the order of 1 inch or less. In the event pipe having a larger wall thickness is to be welded according to this method, a modified V groove as shown in Fig. 5 may be employed. In this figure the pipes 51 and 52 employ a double taper with the lower portions of the taper 51' and 52' respectively being formed at an angle of about 20° with a central vertical plane while the upper end of the taper 51" and 52" are formed at an angle of about 10° with a vertical plane. In this way, considerable less filler metal is required while at the same time obtaining equally strong and durable joints.

While the foregoing description was generally confined to the use of combustible baffles 24 and 26 in connection with the welding of pipes, it is apparent that the same procedure can be used in the welding of other types of structures in which it would otherwise be difficult to provide gas retaining baffles, and to remove such baffles after the welding has been completed.

Actual tests with the invention described above have indicated that highly improved welds and particularly strong and durable root welds can be easily and consistently produced at a relatively low cost for both material as well as labor. The arrangement for visual inspection of the weld, prior to its ultimate completion has been found to save considerable time in repair and maintenance of multiple section pipe whether they be prepared in the shop or in the field. In addition to the improved weld obtained by this procedure, it has been found that through retention of the backing gas in and about the heated area of the pipes during the several welding operations that a very much more desirable inside wall condition is secured than is obtainable in instances where the backing gas is permitted to be disbursed after the completion of the root weld. It will be noted that the process of welding in accordance with this invention provides for a rapid sealing of the purging hole 35 after removal of the pipe 36 to prevent unnecessary escape of the backing gas. This, therefore, accounts for highly improved pipe wall condition upon the completion of the welding operation.

Another important advantage of this invention resides in the fact that even in instances where the inside wall is not recessed in the manner denoted by the numerals 18 and 20 of Fig. 1, satisfactory results can be nevertheless obtained through the application of this welding method. It has been found that through careful application of heat to effect the root weld, relatively small extension of the internal bead 45 is perceptible within the completely welded joint.

This invention in its broader aspects is not limited to the specific steps, combinations and improvements described but departures may be made therefrom within the scope of the accompanying claims without departing from the principles of the invention and without sacrificing its chief advantages.

What is claimed is:

1. The method of welding two pipes end to end, comprising the steps of tapering the ends of said pipes to provide a peripheral groove with the bottom thereof spaced from the internal walls of said pipes when said pipes are in abutting relationship; sealing a combustible imperforate baffle in each pipe at a point spaced from the end thereof; securing said pipes in said abutting relationship and in alignment one with the other; forming an opening through the meeting edges of said pipes; introducing an inert gas through said opening to fill the chamber defined by said baffles and the intervening portions of said pipes; welding said pipes while retaining the inert gas within said chamber during at least part of the welding operation; and, then heating said weld part to stress relieve the joint and burn the combustible baffles.

2. The method of welding two pipes end to end, comprising the steps of sealing a combustible imperforate baffle in each pipe at a point spaced from the end thereof; holding said pipes in abutting relationship; introducing an inert gas through an opening into the chamber defined by the baffles and intervening pipe parts; welding said pipes one to the other; and, then heating said welded pipe ends to burn the combustible baffles.

3. The method of welding elongated hollow members end to end, comprising the steps of fastening a combustible imperforate baffle in each member at a point spaced from the end thereof; holding said members in abutting relationship; preheating the ends of said members to a temperature below the ignition temperature of said baffles; introducing an inert gas through an opening into the chamber defined by said baffles and the intervening parts of said members; welding said members one to the other; and, then heating said welded end parts to a temperature above the ignition point of said baffles.

4. The method according to claim 3 wherein said combustible baffles are formed of paper sealed to said members by a combustible adhesive tape.

5. The method of welding pipes end-to-end comprising the steps of beveling a portion of the end of each pipe to provide a peripheral welding groove when the pipes are brought into abutting relationship, and an ungrooved root part; fastening combustible imperforate baffles in each pipe at a point spaced from the end to be welded; holding said pipes in abutting relationship; forming an opening in said root portion of the meeting pipe ends; introducing an inert gas under pressure through said opening; preheating the pipe ends to a temperature below the combustion point of said baffles; welding the root part of the abutting pipe ends by the application of heat thereto; applying a layer of weld metal over said welded root part; removing the gas inserting means and welding said opening to completely seal the joint; applying successive layers of weld metal completely to fill the groove; and, then heating said welded pipe ends to a temperature above the ignition point of said baffles to destroy the baffles and stress-relieve the welded pipe ends.

6. The method according to claim 5 wherein said baffles are formed of paper.

References Cited in the file of this patent
UNITED STATES PATENTS

| | | |
|---|---|---|
| 1,962,350 | Kane | June 12, 1934 |
| 2,433,296 | Schaefer | Dec. 23, 1947 |
| 2,495,129 | Perrine et al. | Jan. 17, 1950 |
| 2,496,188 | Wiese | Jan. 31, 1950 |